(12) United States Patent
Lu et al.

(10) Patent No.: US 11,232,576 B2
(45) Date of Patent: Jan. 25, 2022

(54) SYSTEMS AND METHODS FOR DETERMINING MOTION OF AN OBJECT IN IMAGING

(71) Applicant: SHANGHAI UNITED IMAGING HEALTHCARE CO., LTD., Shanghai (CN)

(72) Inventors: Jie Lu, Beijing (CN); Guoguang Zhao, Beijing (CN); Hui Liu, Shanghai (CN); Yuhang Shi, Shanghai (CN); Qiang He, Shanghai (CN); Jun'an Zheng, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 103 days.

(21) Appl. No.: 16/510,254

(22) Filed: Jul. 12, 2019

(65) Prior Publication Data
US 2020/0302619 A1    Sep. 24, 2020

(30) Foreign Application Priority Data

Mar. 20, 2019 (CN) .......................... 201920356766.1
Mar. 20, 2019 (CN) .......................... 201920357710.8

(51) Int. Cl.
*G06T 7/246* (2017.01)
*G06T 7/557* (2017.01)
*G06T 11/00* (2006.01)

(52) U.S. Cl.
CPC .............. *G06T 7/248* (2017.01); *G06T 7/557* (2017.01); *G06T 11/003* (2013.01); *G06T 2207/10072* (2013.01); *G06T 2207/20224* (2013.01)

(58) Field of Classification Search
CPC ........ G06T 11/003; G06T 7/521; G06T 7/557
See application file for complete search history.

(56) References Cited

U.S. PATENT DOCUMENTS

| | | | |
|---|---|---|---|
| 2012/0089949 A1* | 4/2012 | Chen | G06K 9/00335 715/848 |
| 2015/0094606 A1* | 4/2015 | Mestha | A61B 5/4818 600/534 |
| 2015/0238149 A1* | 8/2015 | Nitta | A61B 5/7278 600/413 |
| 2015/0243045 A1* | 8/2015 | Ra | A61B 6/032 382/131 |
| 2017/0367612 A1* | 12/2017 | Kawrykow | A61B 5/7257 |

* cited by examiner

*Primary Examiner* — Kenny A Cese
(74) *Attorney, Agent, or Firm* — Metis IP LLC

(57) ABSTRACT

The present disclosure relates to systems and methods for determining a motion of an object during imaging. The systems and methods may cause a light emission device to project a structured light onto the object, and cause a light reception device to detect light resulting from the structured light as projected onto the object and generate a plurality of measured images of the structured light based on the detected light. The systems and methods may further determine the motion of the object based on the plurality of measured images of the structured light and a reference image of the structured light.

17 Claims, 12 Drawing Sheets

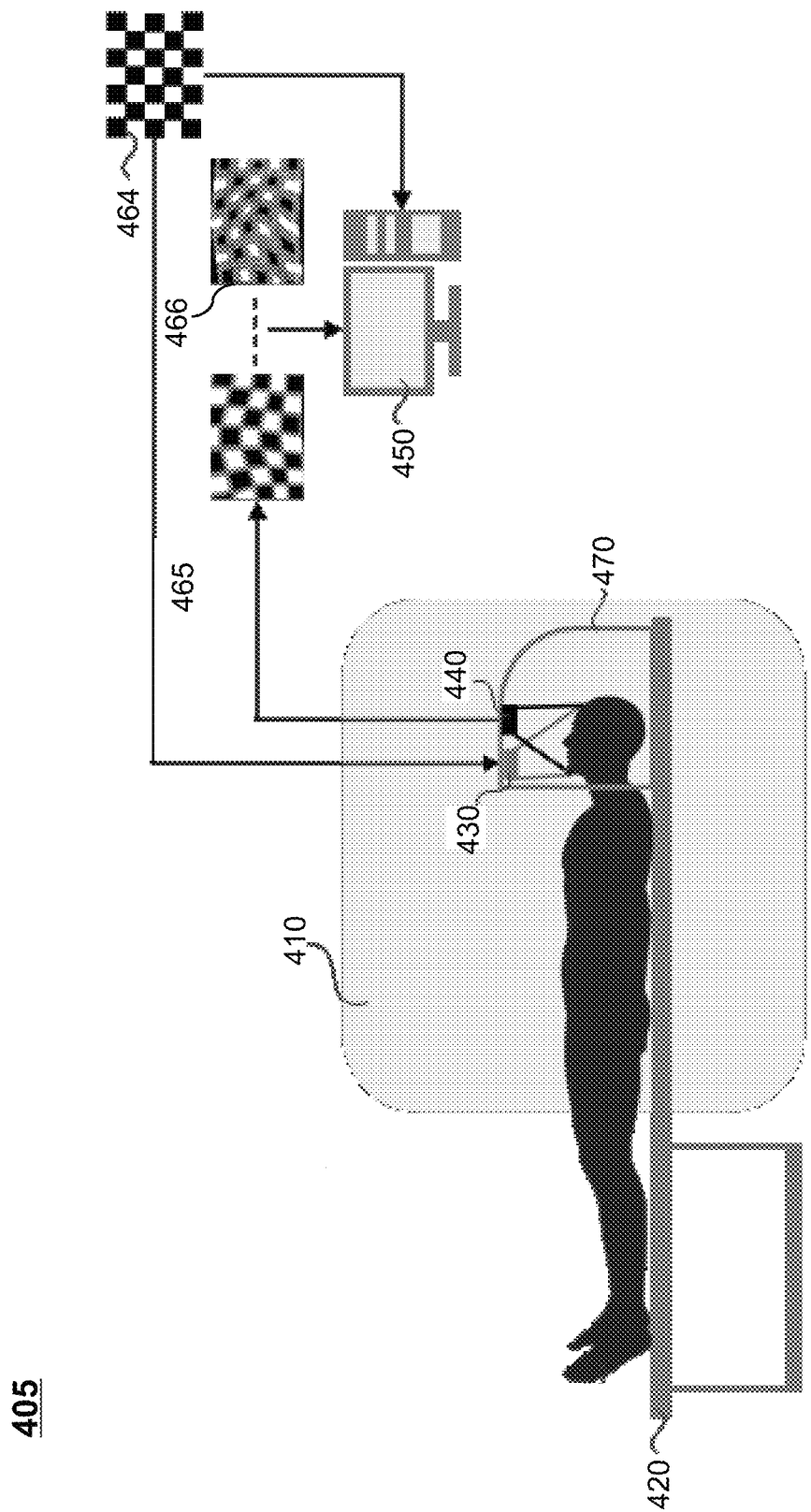

SYSTEMS AND METHODS FOR DETERMINING MOTION OF AN OBJECT IN IMAGING

CROSS-REFERENCE TO THE RELATED APPLICATIONS

This application claims priority of Chinese Application No. 201920356766.1, filed on Mar. 20, 2019, and Chinese Application No. 201920357710.8, filed on Mar. 20, 2019, the contents of each of which are hereby incorporated by reference.

TECHNICAL FIELD

The present disclosure generally relates to the fields of imaging, and more specifically relates to systems and methods for determining a motion of an object during imaging.

BACKGROUND

Non-invasive imaging technologies can obtain image data of internal structures of an object without performing an invasive procedure on the object. An imaging system (such as a computed tomography (CT) system, a positron emission tomography (PET) system, a magnetic resonance imaging (MRI) system, a PET-CT system, a PET-MRI system) exploits various physical principles to obtain scanning data and reconstruct images of the object. If a scan is performed for a chest or abdomen examination, the motion (e.g., physiological motion such as the respiratory motion of the lungs of the object, the cardiac motion of the heart of the object) of the object undergoing during the scan by the imaging system may cause motion artifacts in the acquired images. If a scan is performed for a head examination, the motion (e.g., the motion of the eyes of the object, the posture change of the object such as the movement of the head) of the object undergoing during the scan by the imaging system may cause motion artifacts in the acquired images. In order to remove or reduce the motion artifacts in images so acquired, it is desirable to eliminate or reduce the impact of the motion of the object on the scanning data. Accordingly, it is desirable to develop systems and methods for determining/detecting the motion of an object real-time while the scanning data is obtained.

SUMMARY

In one aspect of the present disclosure, a system is provided. The system may include a light emission device, a light reception device, and a motion determination device. The light emission device may be configured to project a structured light onto an object. The light reception device may be configured to detect light resulting from the structured light as projected onto the object and generate a plurality of measured images of the structured light based on the detected light. The motion determination device may be configured to determine a motion of the object based on the plurality of measured images of the structured light and a reference image of the structured light.

In some embodiments, the light emission device may be disposed at a first position, and the light reception device may be disposed at a second position.

In some embodiments, the system may further include a scanning device configured to acquire scanning data of the object by scanning the object, and an image reconstruction device configured to reconstruct an image of the object based on the scanning data.

In some embodiments, the image reconstruction device may be configured to reconstruct the image of the object based on the scanning data and the motion of the object.

In some embodiments, the motion of the object may include a stable motion phase. The scanning device may be configured to acquire the scanning data of the object by scanning the object during the stable motion phase.

In some embodiments, the scanning device may be configured to adjust one or more scanning parameters based on the motion of the object, and acquire the scanning data by scanning, based on the adjusted one or more scanning parameters, the object.

In some embodiments, at least one of the first position or the second position may be on a scanning device.

In some embodiments, the system may further include a coil component. At least one of the first position or the second position may be on the coil component.

In some embodiments, one of the first position may be on the coil component, and the other may be on a scanning device.

In some embodiments, each of the plurality of measured images may include a plurality of pixels corresponding to a plurality of positions on the object. The reference image may include a plurality of pixels corresponding to the plurality of positions on the object. The light emission device and the light reception device may satisfy a geometrical relationship. The motion determination device may be further configured to, for each measured image of the plurality of measured images, determine, based on the geometrical relationship and the measured image, a plurality of measured distances, each of the plurality of measured distances being between one of the plurality of positions and the light emission device; determine, based on the geometrical relationship and the reference image, a plurality of reference distances, each of the plurality of reference distances being between one of the plurality of positions and the light emission device; and determine a depth image corresponding to the measured image based on a plurality of differences, each of the plurality of differences being between one of the plurality of measured distances of a position of the plurality of positions and a reference distance of the same position; and determine the motion of the object based on a plurality of depth images corresponding to the plurality of measured images.

In some embodiments, the system may further include a plurality of light emission devices disposed at different positions, each of which is configured to project at least a portion of the structured light onto at least a portion of the object. The system may also include a plurality of light reception devices disposed at different positions, each of which is configured to detect at least a portion of the detected light.

In some embodiments, the motion of the object may include a physiological motion of the object and a posture change of the object.

In another aspect of the present disclosure, a method is provided. The method may be implemented on a computing device having at least one processor and at least on storage device. The method may include causing a light emission device to project a structured light onto an object; causing a light reception device to detect light resulting from the structured light as projected onto the object and generate a plurality of measured images of the structured light based on the detected light; and determining a motion of the object based on the plurality of measured images of the structured light and a reference image of the structured light.

In some embodiments, the light emission device may be disposed at a first position, and the light reception device may be disposed at a second position.

In some embodiments, at least one of the first position or the second position may be on a coil component. In some embodiments, at least one of the first position or the second position may be on a scanning device.

In some embodiments, the motion may include a stable motion phase and an unstable motion phase. The method may further include causing a scanning device to acquire scanning data of the object by scanning the object during the stable motion phase; and reconstructing an image of the object based on the scanning data.

In some embodiments, the motion may include a stable motion phase and an unstable motion phase. The method may further include causing a scanning device to acquire scanning data of the object by scanning the object; extracting a portion of the scanning data corresponding to the stable motion phase; and reconstructing an image of the object based on the extracted portion of the scanning data.

In yet another aspect of the present disclosure, a system is provided. The system may include at least one storage device and at least one processor in communication with the at least one storage device. The at least one storage device may include a set of instructions. When executing the set of instructions, the at least one processor may be configured to cause the system to perform operations including: causing a light emission device to project a structured light onto an object; causing a light reception device to detect light resulting from the structured light as projected onto the object and generate a plurality of measured images of the structured light based on the detected light; and determining a motion of the object based on the plurality of measured images of the structured light and a reference image of the structured light.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 4C is a schematic diagram illustrating an exemplary imaging system according to some embodiments of the present disclosure;

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by other expression if they achieve the same purpose.

Figure 2:
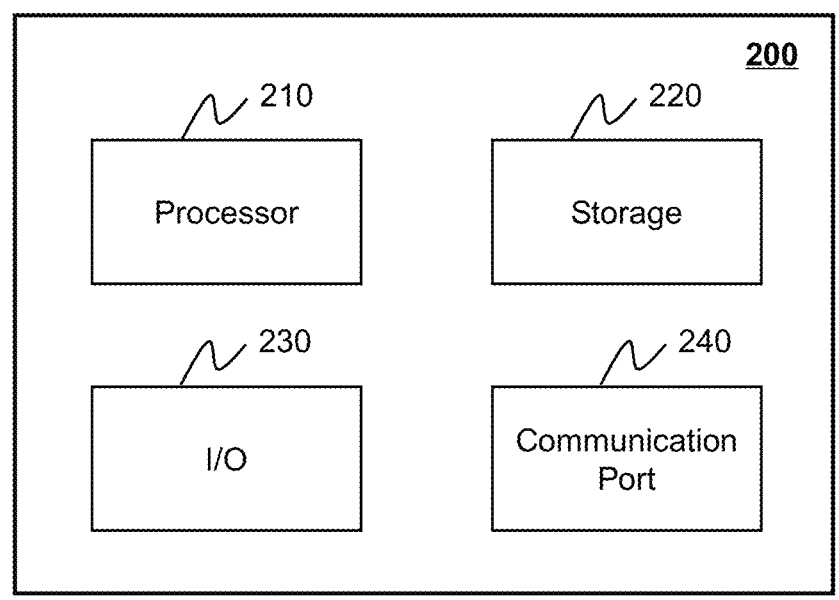
FIG. 2 is a schematic diagram illustrating exemplary hardware and/or software components of a computing device on which the processing device may be implemented according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included of connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

An aspect of the present disclosure relates to systems and methods for determining a motion of an object in imaging. As used herein, the "motion" may also include a signal describing or corresponding to the motion (or referred to as a motion signal for brevity). In some embodiments, the motion and the motion signal may be used interchangeably. The systems and methods may cause a light emission device to project a structured light onto the object. The systems and methods may also cause a light reception device to detect light resulting from the structured light as projected onto the object and generate a plurality of measured images of the structured light based on the detected light. The systems and methods may further determine the motion of the object based on the plurality of measured images and a reference image. In some embodiments, the reference image is one of the plurality of measured images. In some embodiments, the motion of the object may include a physiological motion and a posture change (or referred to as a rigid motion). The physiological motion may include a cardiac motion a respiratory motion, a motion of the eyes, or the like. The posture change may include a movement of a head, a change of facial expression such as tired, sober, smiling, serious. In some embodiments, during a scan for a chest or abdomen examination, the motion of the object may include the cardiac motion and the respiratory motion. The systems and methods may extract information regarding the cardiac motion and/or information regarding the respiratory motion from the physiological motion of the object. In some embodiments, during a scan for a head examination, the systems and methods may determine the motion of the eyes, the movement of the head, or the change of facial expression using the light emission device and the light reception device.

Figure 1:
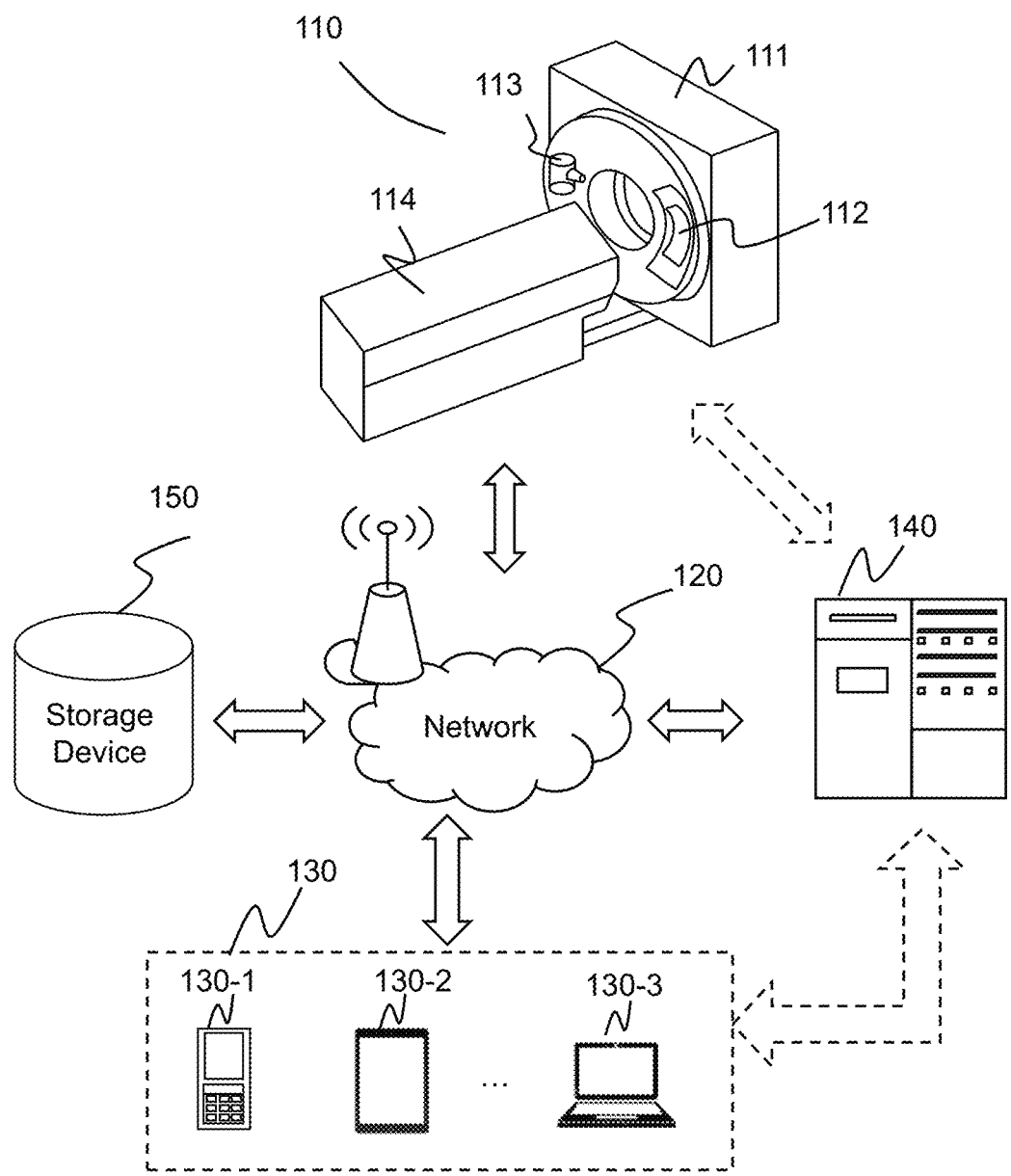
FIG. 1 is a schematic diagram illustrating an exemplary imaging system according to some embodiments of the present disclosure.

FIG. 1 is a schematic diagram illustrating an exemplary imaging system according to some embodiments of the present disclosure. The imaging system 100 may include a computed tomography (CT) system, a computed tomography angiography (CTA) system, a positron emission tomography (PET) system, a single photon emission computed tomography (SPECT) system, a magnetic resonance imaging (MRI) system, or the like, or a combination thereof. In some embodiments, the medical imaging system may be solely used. In some embodiments, the medical imaging system may be used with a multi-modality system (e.g., a PET-CT system, a PET-MRI system).

As illustrated in FIG. 1, the imaging system 100 may include a scanning device 110, a network 120, one or more terminals 130, a processing device 140, and a storage device 150. The components in the imaging system 100 may be connected in one or more of various ways. Merely by way of example, the scanning device 110 may be connected to the processing device 140 through the network 120. As another example, the scanning device 110 may be connected to the processing device 140 directly as indicated by the bi-directional arrow in dotted lines linking the scanning device 110 and the processing device 140. As a further example, the storage device 150 may be connected to the processing device 140 directly or through the network 120. As still a further example, the terminal 130 may be connected to the processing device 140 directly (as indicated by the bi-directional arrow in dotted lines linking the terminal 130 and the processing device 140) or through the network 120.

Taking a CT system as an example, as illustrated in FIG. 1, the scanning device 110 may include a gantry 111, a detector module 112, a radiation source 113, and a scanning table 114. The detector module 112 and the radiation source 113 may be oppositely mounted on the gantry 111. An object may be placed on the scanning table 114 and moved into a detection tunnel of the scanning device 110. The object may be a biological object (e.g., a patient, an animal) or a non-biological object (e.g., a human-made object). In some embodiments, the object may include an organ (e.g., the lungs, the liver, the stomach), a body part (e.g., the chest, the abdomen), an injured part, a tumor, or the like, or any combination thereof. In the present disclosure, "subject" and "object" are used interchangeably.

The radiation source 113 may emit radiation rays to scan the object that is placed on the scanning table 114. The radiation rays may include X-rays, y-rays, a-rays, ultraviolet, laser, neutron, proton, or the like, or a combination thereof. The detector module 112 may receive the radiation rays passed through the object. In some embodiments, the detector module 112 may include a plurality of detector units, which may be arranged in a channel direction and a row direction. The detector units may include a scintillation detector (e.g., a cesium iodide detector) or a gas detector. In some embodiments, the radiation source 113 may be omitted in some imaging systems, for example, in a PET system. In the PET system, the object may be injected with a radioactive substance (e.g., radiopharmaceutical). The detector module 112 may detect radiations (e.g., gamma photons) emitted from the radioactive substance.

The network 120 may facilitate exchange of information and/or data. In some embodiments, one or more components of the imaging system 100 (e.g., the scanning device 110, the terminal 130, the processing device 140, or the storage device 150) may send information and/or data to another component(s) in the imaging system 100 via the network 120. For example, the processing device 140 may cause, via the network 120, a light emission device to project a structured light onto an object. As another example, the processing device 140 may cause, via the network 120, a light reception device to detect light resulting from the structured light as projected onto the object and generate a plurality of measured images of the structured light based on the detected light. In some embodiments, the network 120 may be any type of wired or wireless network, or combination thereof. The network 120 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired or wireless network access points such as base stations and/or internet exchange points through which one or more components of the imaging system 100 may be connected to the network 120 to exchange data and/or information.

The terminal 130 include a mobile device 130-1, a tablet computer 130-2, a laptop computer 130-3, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, eyeglasses, a helmet, a watch, clothing, a backpack, an accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a HoloLens, a Gear VR, etc. In some embodiments, the terminal 130 may remotely operate the scanning device 110. In some embodiments, the terminal 130 may operate the scanning device 110 via a wireless connection. In some embodiments, the terminal 130 may receive information and/or instructions inputted by a user, and send the received information and/or instructions to the scanning device 110 or to the processing device 140 via the network 120. In some embodiments, the terminal 130 may receive data and/or information from the processing device 140. In some embodiments, the terminal 130 may be part of the processing device 140. In some embodiments, the terminal 130 may be omitted.

In some embodiments, the processing device 140 may process data obtained from the scanning device 110, the terminal 130, or the storage device 150. For example, the processing device 140 may determine the physiological motion of the object based on a plurality of measured images of the structured light and a reference image of the structured light. The processing device 140 may be a central processing unit (CPU), a digital signal processor (DSP), a system on a chip (SoC), a microcontroller unit (MCU), or the like, or any combination thereof. In some embodiments, the processing device 140 may be a single server or a server group. The server group may be centralized or distributed. In some embodiments, the processing device 140 may be local or remote. For example, the processing device 140 may access information and/or data stored in the scanning device 110, the terminal 130, and/or the storage device 150 via the network 120. As another example, the processing device 140 may be directly connected to the scanning device 110, the terminal 130, and/or the storage device 150, to access stored information and/or data. In some embodiments, the processing device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 140 may be implemented on a computing device 200 having one or more components illustrated in FIG. 2 in the present disclosure.

The storage device 150 may store data and/or instructions. In some embodiments, the storage device 150 may store data obtained from the terminal 130 and/or the processing device 140. In some embodiments, the storage device 150 may store data and/or instructions that the processing device 140 may execute or use to perform exemplary methods described in the present disclosure. In some embodiments, the storage device 150 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components of the imaging system 100 (e.g., the terminal 130, the processing device 140). One or more components of the imaging system 100 may access the data or instructions stored in the storage device 150 via the network 120. In some embodiments, the storage device 150 may be directly connected to or communicate with one or more components of the imaging system 100 (e.g., the terminal 130, the processing device 140). In some embodiments, the storage device 150 may be part of the processing device 140.

FIG. 2 is a schematic diagram illustrating exemplary hardware and/or software components of a computing device 200 on which the processing device 140 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (program code) and, when executing the instructions, cause the processing device 140 to perform functions of the processing device 140 in accordance with techniques described herein. The computer instructions may include, for example, routines, programs, objects, components, signals, data structures, procedures, modules, and functions, which perform particular functions described herein. In some embodiments, the processor 210 may process data and/or images obtained from the scanning device 110, the terminal 130, the storage device 150, and/or any other component of the imaging system 100. For example, the processor 210 may determine the physiological motion of the object based on the plurality of measured images of a structured light and a reference image of the structured light. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both process A and process B, it should be understood that process A and process B may also be performed by two or more different processors jointly or separately in the computing device 200 (e.g., a first processor executes process A and a second processor executes process B, or the first and second processors jointly execute processes A and B).

The storage 220 may store data/information obtained from the scanning device 110, the terminal 130, the storage device 150, or any other component of the imaging system 100. In some embodiments, the storage 220 may include a mass storage device, removable storage device, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure.

The I/O 230 may input or output signals, data, and/or information. In some embodiments, the I/O 230 may enable a user interaction with the processing device 140. In some embodiments, the I/O 230 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 240 may be connected to a network (e.g., the network 120) to facilitate data communications. The communication port 240 may establish connections between the processing device 140 and the scanning device 110, the terminal 130, or the storage device 150. The connection may be a wired connection, a wireless connection, or a combination of both that enables data transmission and reception. The wired connection may include an electrical cable, an optical cable, a telephone wire, or the like, or any combination thereof. The wireless connection may include Bluetooth, Wi-Fi, WiMAX, WLAN, ZigBee, mobile network (e.g., 3G, 4G, 5G, etc.), or the like, or a combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
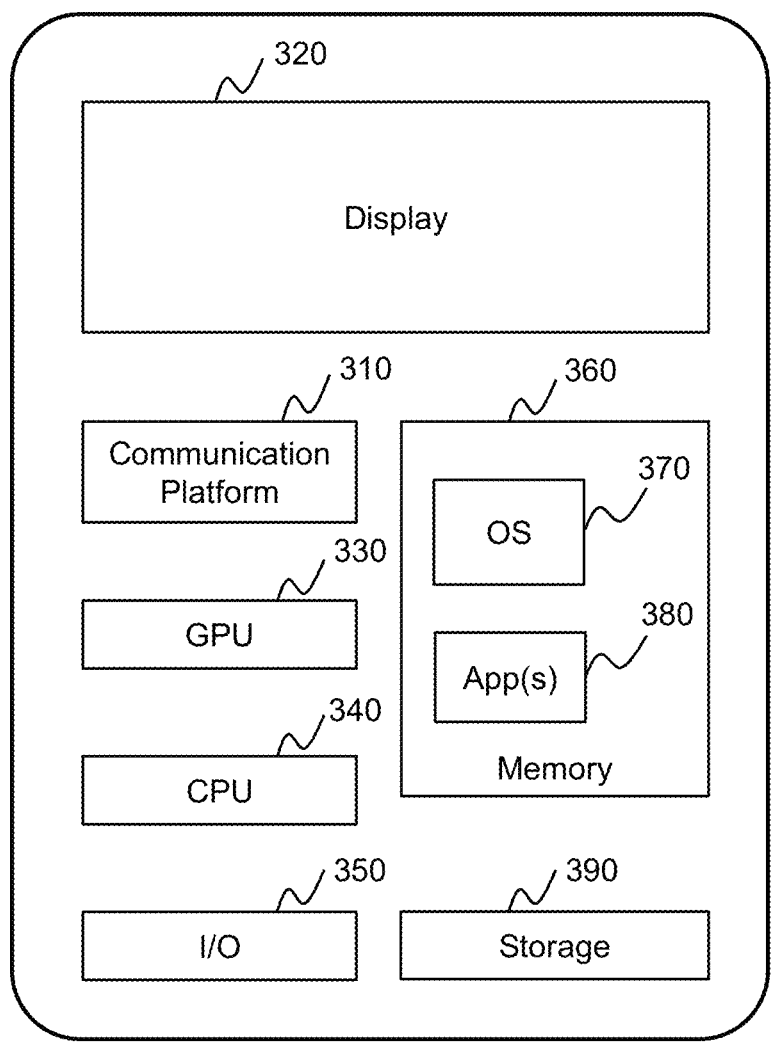
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 according to some embodiments of the present disclosure. As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS, Android, Windows Phone, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing device 140. User interactions with the information stream may be achieved via the I/O 350 and provided to the processing device 140 and/or other components of the imaging system 100 via the network 120.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to determine the physiological motion of an object as described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result, the drawings should be self-explanatory.

Figure 4A:
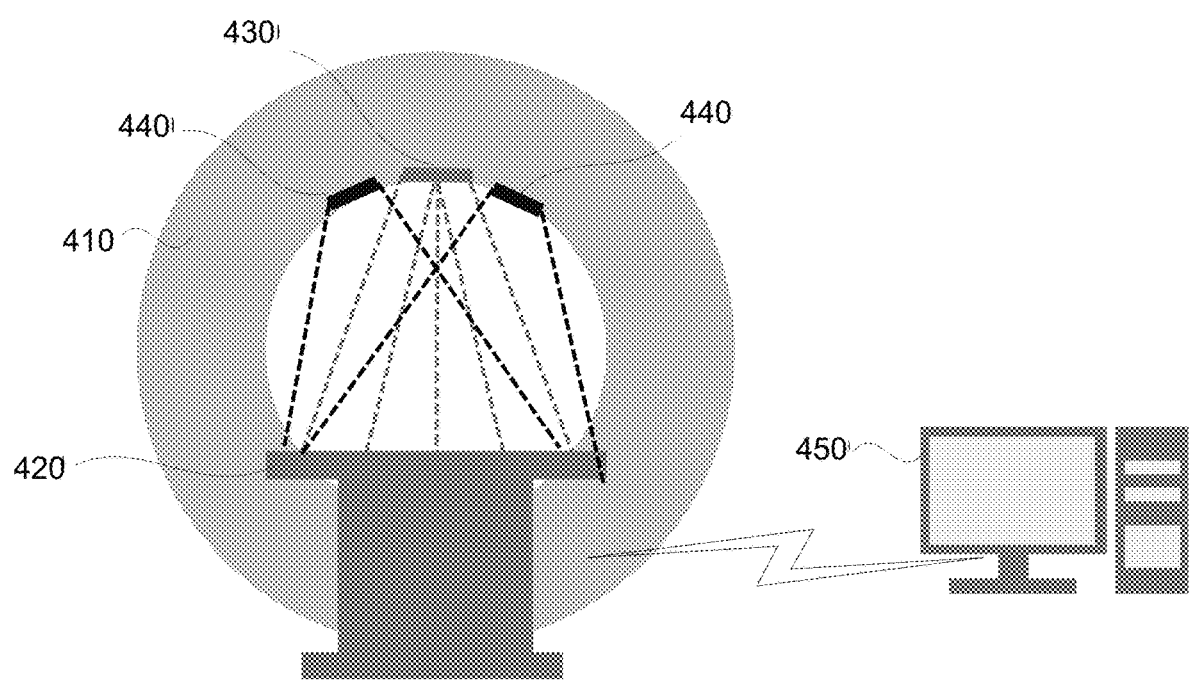
FIGS. 4A and 4B are schematic diagrams illustrating an exemplary imaging system according to some embodiments of the present disclosure.
Figure 4B:
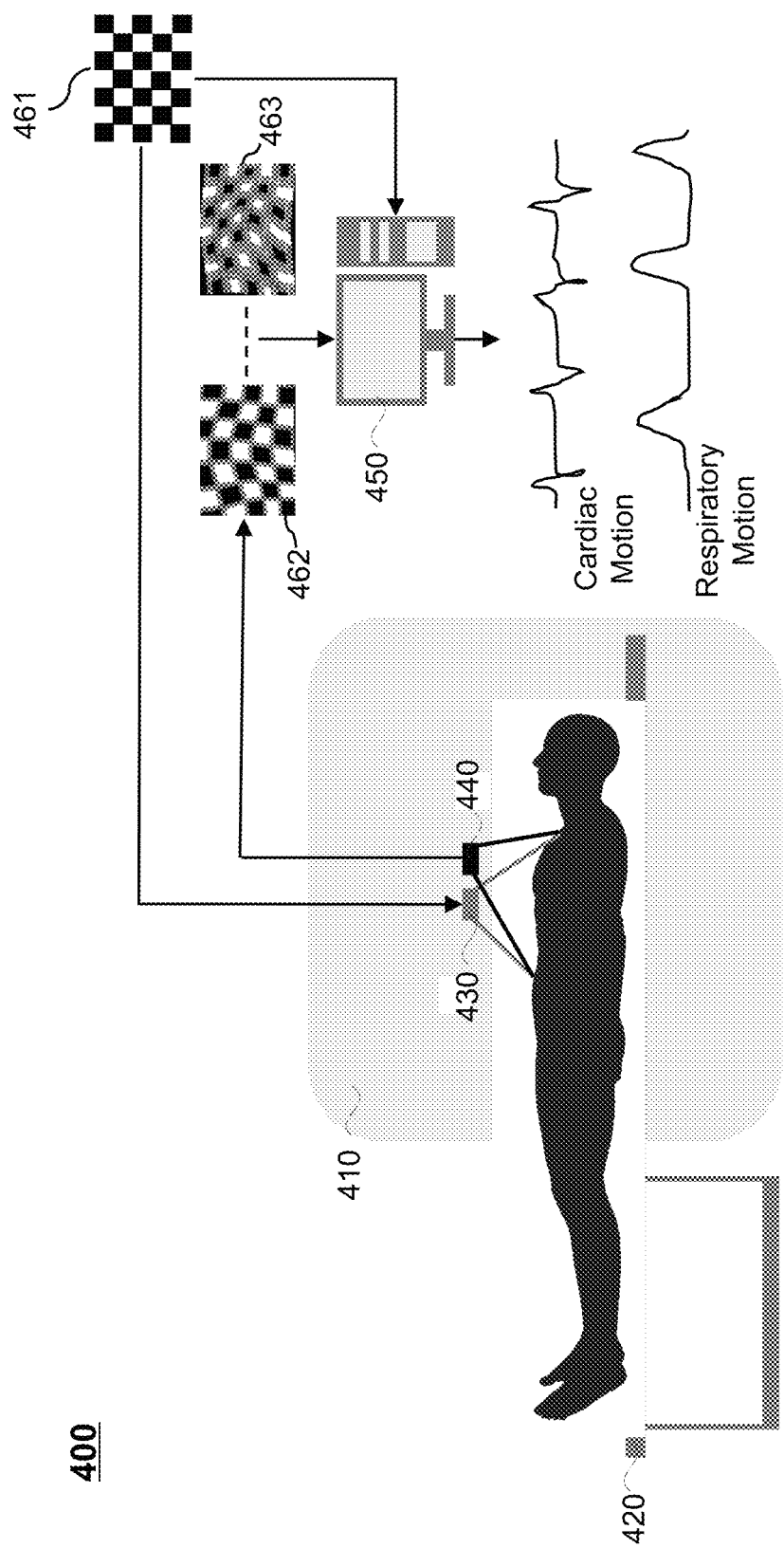

FIGS. 4A and 4B are schematic diagrams illustrating an exemplary imaging system according to some embodiments of the present disclosure. FIGS. 4A and 4B show two views of the imaging system 400. The imaging system 400 may include a scanning device 410, a scanning table 420, a light emission device 430, a light reception device 440, and a motion determination device 450.

The scanning device 410 may be configured to acquire scanning data of an object by scanning the object. In some embodiments, the object may include an organ (e.g., a lung, the liver, the stomach), a body part (e.g., the chest, the abdomen, the head), an injured part, a tumor, or the like, or any combination thereof. As shown in FIG. 4B, the scanning device 410 may acquire scanning data of the chest or the abdomen of the object. The scanning table 420 can move along a long axis of the scanning table 420. The object may be placed on the scanning table 420 (e.g., as shown in FIG. 4B), and moved into a detection tunnel of the scanning device 410 via the scanning table 420. In some embodiments, the scanning device 410 may be a CT device, a PET device, an MRI device, a PET-CT device, a PET-MRI device, or the like. If the scanning device 410 is a CT device, the scanning device 410 may generate CT scanning data. If the scanning device 410 is an MRI device, the scanning device 410 may generate MRI scanning data. If the scanning device 410 is a PET-CT device, the scanning device 410 may generate PET-CT scanning data. If the scanning device 410 is a PET-MRI device, the scanning device 410 may generate PET-MRI scanning data. In some embodiments, the scanning device 410 may include a gantry, a detector module (not shown in FIGS. 4A and 4B) and a radiation source (not shown in FIGS. 4A and 4B). The detector module and the radiation source may be oppositely mounted on the gantry. The radiation source may emit radiation rays toward the object that is placed on the scanning table 420. The detector module may detect radiation rays, at least some of which have passed through the object. More descriptions of the scanning device 410 may be found elsewhere in the present disclosure (e.g., FIG. 1 and the relevant descriptions thereof).

The light emission device 430 may be configured to provide a structured light and project the structured light onto the object. In some embodiments, the light emission device 430 may also be referred to as a light source. The light emission device 430 may project the structured light onto the object continuously. Alternatively, the light emission device 430 may project the structured light onto the object intermittently which may extend the life of the light emission device 430. For example, the light emission device 430 may continuously emit the structured light for a time period (e.g., 5 minutes, 10 minutes, 15 minutes), and then stop emitting the structured light for another time period, e.g., one minute. In some embodiments, the light emission device 430 can project the structured light onto at least a portion of the object. For example, the light emission device 430 may project the structured light onto the chest, onto the abdomen, onto the head, or the like. The light reception device 440 may include an image sensor that is configured to detect light resulting from the structured light as projected onto the object and generate a plurality of measured images of the structured light based on the detected light. The image sensor may include a charge-coupled device (CCD), a complementary metal-oxide semiconductor (CMOS), or the like, or any combination thereof. In some embodiments, the light reception device 440 may also be referred to as a camera. In some embodiments, the structured light provided by the light emission device 430 may be light within a certain spectral range. For example, the structured light may be an infrared light. As another example, the structured light may be an ultraviolet light. Correspondingly, the light reception device 440 (or the image sensor of the light reception device 440) may be configured to detect the structured light within the spectral range.

In some embodiments, the light emission device 430 may be disposed at a first position. The light reception device 440 may be disposed at a second position different from the first position. In some embodiments, at least one of the first position or the second position may be on the scanning device 410. For example, the first position and the second position may be two different positions on the gantry of the scanning device 410 (as shown in FIG. 4A). In some embodiments, the imaging system 400 may also include a frame (not shown in FIG. 4A) on which the light emission device 430 and/or the light reception device 440 may be mounted. The frame may be mounted on the ceiling or a wall of a room in which the imaging system 400 is located. In some embodiments, the first position and the second position may be two different positions on the frame. Alternatively, the first position or the second position may be a position on the frame, and the other may be a position on the scanning device 410. It should be noted that the light emission device 430 and/or the light reception device 440 may be disposed at any position as long as the light emission device 430 can project the structured light onto the object and the light reception device 440 can detect the light resulting from the structured light as projected onto the object. In some embodiments, at least one of the light emission device 430 or the light reception device 440 may be mounted on the scanning table 420. In some embodiments, the light emission device 430 and the light reception device 440 may satisfy a geometrical relationship. The geometrical relationship may be characterized by at least one of a distance between the light emission device 430 and the light reception device 440 (i.e., a distance between the first position and the second position), an orientation of the light emission device 430, an orientation of the light reception device 440, or the like, or any combination thereof. The geometrical relationship may be known after the light emission device 430 and the light reception device 440 are fixed. In some embodiments, when the distance between the light emission device 430 and the light reception device 440 is larger, the distortion of the pattern of the structured light may be more obvious.

In some embodiments, the imaging system 400 may include a plurality of light emission devices 430 disposed at different positions. A light emission device 430 may be configured to project at least a portion of the structured light onto at least a portion of the object. For example, a first light emission device may project structured light onto the chest, and a second light emission device may project structured light onto the abdomen. In some embodiments, the plurality of light emission devices 430 may provide the structured light of the same pattern. Alternatively, at least two of the plurality of light emission devices 430 may provide the structured light of different patterns. In some embodiments, the imaging system 400 may include a plurality of light reception devices 440 disposed at different positions. A light reception device 440 may be configured to detect at least a portion of the detected light. In some embodiments, the light reception devices 440 at different positions may have different sensitivities to motion of the object (e.g., a physiological motion of the object, a posture change of the object). For example, a light reception device disposed over the object may have a higher sensitivity to the motion of the object than a light reception device disposed on one side of the object. Merely by way of example, as shown in FIG. 4A, the imaging system 400 may include a light emission device 430 and two light reception devices 440.

In some embodiments, the structured light may be a three-dimensional (3D) structured light. The structured light may be a pattern including a dot pattern, a stripe pattern, a checker board pattern, or the like, or any combination thereof. As shown in FIG. 4B, the structured light may have a checker board pattern 461. The light emission device 430 may project a structured light with the checker board pattern 461 onto the object (e.g., the chest and abdomen of the object). The light reception device 440 may detect light resulting from the structured light as projected onto the object. Because different positions on the object may have different heights, the pattern of the light detected by the light reception device 440 may be distorted compared to the structured light from the light emission device 430. In some embodiments, during the scan of the chest or abdomen, the object may undergo physiological motion, such as a cardiac motion, a respiratory motion. Due to the physiological motion of the object, the distortion of the pattern of the light detected at different moments (or different time points) may be different. The light reception device 440 may generate a plurality of measured images based on the light detected at different moments (or different time points). As shown in FIG. 4B, the image 462 and image 463 are two exemplary images generated by the light detected at two moments by the light reception device 440. In some embodiments, the image 462 may be a measured image with the smallest distortion among the plurality of measured images, and designated as a reference image. The reference image (e.g., the image 462) may correspond to a moment (e.g., a breath-hold moment) of the physiological motion of the object. The outer surface of the object corresponding to the moment may be referred to as a reference plane. The physiological motion of the object may be detected, e.g., by the motion determination device 450, based on the reference image and the plurality of measured images.

In some embodiments, the motion determination device 450 may be part of the processing device 140 and perform some functions of the processing device 140. The motion determination device 450 may be connected with the light emission device 430 and/or the light reception device 440 via a network (e.g., the network 120). The motion determination device 450 may be configured to determine the physiological motion of the object (e.g., the cardiac motion, the respiratory motion) based on the plurality of measured images and the reference image. In some embodiments, for each of the plurality of measured images, the motion determination device 450 may determine a depth image corresponding to the measured image based on the measured image and the reference image. The depth image may include a plurality of pixels each of which has a pixel value. A pixel value may represent a difference between a reference point on the reference plane and a point on a measured plane. The motion determination device 450 may determine the physiological motion of the object based on a plurality of depth images corresponding to the plurality of measured images. Details regarding the determination of the physiological motion of the object may be found elsewhere in the present disclosure. See, e.g., FIG. 7 and the descriptions thereof. In some embodiments, the physiological motion of the object may include a cardiac motion and a respiratory motion (as shown in FIG. 4B). The motion determination device 450 may be configured to identify the cardiac motion and the respiratory motion from the physiological motion of the object, respectively. In some embodiments, the motion determination device 450 may identify one or more pixels corresponding to the cardiac motion (e.g., pixels corresponding to the heart) from one or more depth images using an image recognition algorithm. The motion determination device 450 may determine the cardiac motion based on the identified pixels of the one or more depth images. Similarly, the motion determination device 450 may identify one or more pixels corresponding to the respiratory motion (e.g., pixels corresponding to a lung, the diaphragm) from one or more depth images using an image recognition algorithm. The motion determination device 450 may determine the respiratory motion based on the identified pixels from the one or more depth images. Exemplary image recognition algorithms may include a neural network-based image recognition algorithm (such as a convolutional neural network (CNN), a recurrent neural network (RNN), a Faster-RCNN, etc.), a wavelet moment-based image recognition algorithm, or the like, or any combination thereof.

FIG. 4C shows a second imaging system 405. As shown in FIG. 4C, the imaging system 405 may include a scanning device 410, a scanning table 420, a light emission device 430, a light reception device 440, a motion determination device 450, and a coil component 470. Unless other stated, like reference numerals in the imaging system 400 and the imaging system 405 refer to like components having the same or similar functions. The object may be placed on the scanning table 420 (e.g., as shown in FIG. 4C), and moved into a detection tunnel of the scanning device 410 via the scanning table 420. The scanning device 410 may be a CT device, a PET device, an MRI device, a PET-CT device, a PET-MRI device, or the like. For instance, the scanning device 410 may be an MRI device, or a PET-MRI device. As shown in FIG. 4C, the scanning device 410 may acquire scanning data of the head of the object. It should be noted that the scanning device 410 in FIG. 4C may acquire scanning data of other body parts of the object (e.g., the chest, the abdomen, the limbs).

In some embodiments, the coil component 470 may be used in an MRI imaging. The coil component 470, disposed over the head of the object (as shown in FIG. 4C), may include one or more coils configured to receive MR signals from the head of the object. It should be noted that the coil component 470 may be disposed over other body parts of the object to receive MR signals from the corresponding body part of the object. In some embodiments, there may be multiple types of coil components 470 used for scanning different body parts. Merely by way of example, the coil components 470 may include a head coil component (e.g., an orthogonal head coil component), a neck coil component (e.g., a neck phased array coil component, a neck surface coil component), a spine coil component (e.g., a spine phased array coil component), a chest coil component (e.g., a chest phased array coil component), an abdomen coil component (e.g., an abdomen phased array coil component, an abdomen surface coil component), a body coil component (e.g., a body phased array coil component, a body phased array surface coil component), or the like, or any combination thereof.

In some embodiments, the light emission device 430 may be disposed at a first position, and the light reception device 440 may be disposed at a second position different from the first position. In some embodiments, the first position and/or the second position may be any position as long as the light emission device 430 can project the structured light onto the object and the light reception device 440 can detect the light resulting from the structured light as projected onto the object. For example, the first position and the second position may be two different position on the scanning device 410 (e.g., the gantry of the scanning device 410). As another example, one of the first position and the second position may be on the scanning device 410 (e.g., the gantry of the scanning device 410), and the other may be on the coil component 470. As a further example, the first position and the second position may be two different positions on the coil component 470.

Figure 4D:
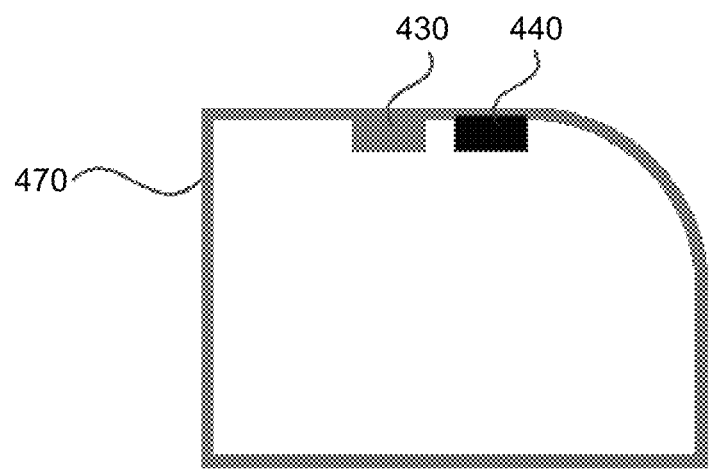
FIGS. 4D and 4E are schematic diagrams illustrating exemplary coil components according to some embodiments of the present disclosure.
Figure 4E:
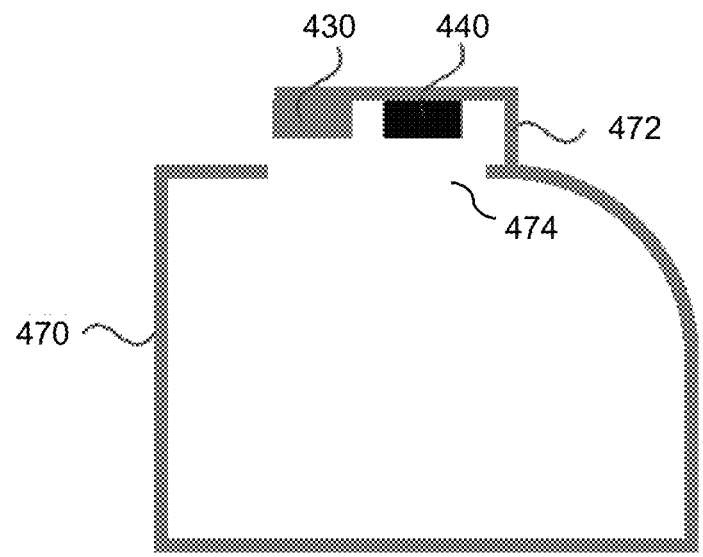

FIGS. 4D and 4E illustrate two exemplary coil components according to some embodiments of the present disclosure. The coil component 470 may have a housing configured to cover an object (e.g., the head of the object shown in FIG. 4C). For simplicity, FIGS. 4D and 4E only depict the side view of the coil component 470. As shown in FIG. 4D, the light emission device 430 and/or the light reception device 440 may be disposed inside the coil component 470. The light emission device 430 and the light reception device 440 may both be mounted on the top of the coil component 470 (as shown in FIG. 4D). Alternatively, one of the light emission device 430 and the light reception device 440 may be mounted on the top of the coil component 470, and the other may be mounted to a side of the coil component 470. Alternatively, the light emission device 430 and the light reception device 440 may be mounted to the side(s) of the coil component 470 (e.g., a same side of the coil component 470, or two different sides of the coil component 470).

As shown in FIG. 4E, the light emission device 430 and the light reception device 440 may be disposed outside the coil component 470. The coil component 470 may include an aperture 474 over the object. The light emission device 430 and the light reception device 440 may be mounted to a fixing component 472. The light emission device 430 can project structured light onto the object via the aperture 474 and the light reception device 440 can detect light resulting from the structured light, e.g., reflected by the object, via the aperture 474. It should be noted that the coil component 470 may include one or more apertures. For example, the coil component 470 may include two apertures (e.g., a first aperture, a second aperture). The light emission device 430, mounted on a first fixing component, may project structured light on the object via the first aperture. The light reception device 440, mounted to a second fixing component, may detect light resulting from the structured light via the second aperture.

In some embodiments, the light emission device 430 and the light reception device 440 may satisfy a geometrical relationship. The geometrical relationship may be characterized by at least one of a distance between the light emission device 430 and the light reception device 440 (i.e., a distance between the first position and the second position), an orientation of the light emission device 430, an orientation of the light reception device 440, or the like, or any combination thereof. In some embodiments, the distance between the light emission device 430 and the light reception device 440 may be several millimeters (e.g., 5 mm, 8 mm, etc.), several centimeters (e.g., 2 cm, 5 cm, 8 cm, 10 cm, 20 cm, etc.), or the like. In some embodiments, the distance between the light emission device 430 and the light reception device 440 may be determined based on the size of the coil component 470. In some embodiments, as the distance between the light emission device 430 and the light reception device 440 increases, the distortion of the pattern of the structured light may be more obvious.

As shown in FIG. 4C, the structured light may have a checker board pattern 464. The light emission device 430 may project a structured light with the checker board pattern 464 onto the head of the object. The light reception device 440 may detect light resulting from the structured light as projected onto the object. For a scan on the head of the object, the object may lie on the scanning table 420, and the object may face upwards. Because different positions on the face of the object (e.g., the eyes, the nose, the mouth, the cheek, the ears) may have different heights, the pattern of the light detected by the light reception device 440 may be distorted compared to the structured light from the light emission device 430. During the scan process, if the scanning needs to take a long time, the object may undergo motion. The motion of the object may include a motion of the eyes (e.g., opening the eyes, closing the eyes, half-closing the eyes, half-opening the eyes, blinking), a posture change of the head (e.g., the movement of the head such as turning left or right; the change of a facial expression such as tired, sober, smiling, serious, etc.). In some embodiments, due to the motion of the object (e.g., the motion of the eye(s), the posture change of the head), the distortion of the pattern of the light detected at different moments (or different time points) may be different. The light reception device 440 may generate a plurality of measured images based on the light detected at different moments (or time points). As shown in FIG. 4C, the image 465 and the image 466 are two exemplary images generated by the light detected at two moments by the light reception device 440. In some embodiments, the image 465 may be a measured image with the smallest distortion among the plurality of measured images, and designated as a reference image. The reference image (e.g., the image 465) may correspond to a moment (e.g., an eye opening moment) of the motion of the object. The outer surface of the object corresponding to the moment may be referred to as a reference plane. The motion of the object may be detected, e.g., by the motion determination device 450, based on the reference image and the plurality of measured images.

The motion determination device 450 may be configured to determine the motion (also referred to as a motion signal) of the object (e.g., the motion of the eye(s), the posture change) based on the plurality of measured images and the reference image. In some embodiments, the plurality of measured images and the reference image may correspond to the whole face of the object. The posture change of the object may be reflected by the position change of an eye, the position change of the nose, the position change of the mouth, or the position change of an ear, or the like, or any combination thereof. In some embodiments, for each of the plurality of measured images, the motion determination device 450 may determine a depth image corresponding to the measured image based on the measured image and the reference image. The depth image may include a plurality of pixels each of which has a pixel value. A pixel value may represent a difference between a reference point on the reference plane and a point on a measured plane (e.g., a difference between a reference point corresponding to a position of the nose on the reference plane and a point corresponding to the position of the nose on the measured plane). The motion determination device 450 may determine the posture change of the object based on a plurality of depth images corresponding to the plurality of measured images. Details regarding the determination of the motion of the object may be found elsewhere in the present disclosure. See, e.g., FIG. 7 and the descriptions thereof. In some embodiments, the imaging process 405 may further include a camera configured to capture an appearance image of the head of the object. When the posture change of the object is relatively obvious, an operator (e.g., a doctor) can discover the posture change of the object based on the appearance image. Then the operator may remind the object to return to the prior posture for subsequent scan.

When determining the motion of the eye(s), the motion determination device 450 may extracting a portion of the measured images corresponding to the eye(s) of the object and a portion of the reference image corresponding to the eye(s) of the object. For an extracted portion of the measured image, the motion device 450 may determine a depth image corresponding to the eye(s) of the object based on the portion of the measured image and the corresponding portion of the reference image. The motion determination device 450 may determine the motion of the eye(s) of the object based on a plurality of depth images corresponding to the extracted portion of the measured images. Alternatively, the light reception device 440 may only detect light resulting from the structured light as projected onto the eye(s) of the object, and generating a plurality of measured images and a reference image corresponding to the eye(s) of the object. Then the motion determination device 450 may determine the motion of the eye(s) of the object based on the plurality of measured images and the reference image corresponding to the eye(s) of the object.

In some embodiments of the present disclosure, during the imaging of the object, the light emission device 430 and the light reception device 440 may be configured to determine the motion of the object (such as the cardiac motion, the abdomen motion, the motion of the eye(s), the posture change, or the like, or any combination thereof), which may effectively correct motion artifacts in a reconstructed image and improve the quality of the reconstructed image. Besides, the light emission device 430 and the light reception device 440 may be disposed at any position other than the body part of the object whose motion is of interest, as long as the light emission device 430 can project the structured light onto the object and the light reception device 440 can detect the light resulting from the structured light as projected onto the object. In some embodiments, the light emission device 430 and the light reception device 440 may be mounted to the scanning device 410 (e.g., the gantry of the scanning device 410), the scanning table 420, the coil 470 as illustrated in FIG. 4C, or the like.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the imaging system 400 may further include an image reconstruction device (not shown in FIG. 4A-4C). The image reconstruction device may be configured to reconstruct an image of the object based on the scanning data. In some embodiments, the motion of the object may include a stable motion phase and an unstable motion phase. In some embodiments, the image reconstruction device may be configured to reconstruct an image of the object based on the scanning data and the motion of the object. The image reconstruction device may extract a portion of the scanning data corresponding to the stable motion phase of the motion. The image reconstruction device may reconstruct the image based on the extracted portion of the scanning data. Details regarding the determination of the image may be found elsewhere in the present disclosure. See, e.g., FIG. 8B and the descriptions thereof. In some embodiments, the scanning device 410 may be configured to acquire scanning data of the object by scanning the object during the stable motion phase of the motion. The image reconstruction device may reconstruct an image of the object based on the acquired scanning data. Details regarding the determination of the image may be found elsewhere in the present disclosure. See, e.g., FIG. 8A and the descriptions thereof.

In some embodiments, there may be one or more scanning parameters (also referred to as scanning protocol(s)) configured to control the scan process of the object. Merely by way of example, the scanning parameter(s) may include information relating to a voltage of a tube of a radiation source (e.g., the radiation source 113), a current of the tube of the radiation source, the type of a focal spot of the radiation source, a size of the focal spot of the imaging radiation source, the type of a bowtie filter of the radiation source, a shot number of the radiation source, a view number of a detector (e.g., a detector of the detector module 112), a time of one revolution of a gantry (e.g., the gantry 111), a tilt angle of the gantry, one or more body parts of the subject to be scanned, a movement direction of a table (e.g., the table 11), position information of the object (e.g., a supine position, a prone position, a decubitus right position, a decubitus left position, etc.), a scanning mode (e.g., a helical scanning, an axial scanning), or the like, or a combination thereof. In some embodiments, the scanning device 410 may be configured to adjust the one or more scanning parameters based on the motion of the object, and acquire the scanning data by scanning the object based on the adjusted one or more scanning parameters. For example, before the scan of the object, the motion of the object may be determined using the light emission device and the light reception device. The scanning device 410 may determine the scanning parameter(s) based on the motion of the object. Then the scanning device 410 may acquire the scanning data by scanning the object based on the determined scanning parameter(s). In some embodiments, the motion of the object may change during the scan process, and thus, the scanning parameter(s) may need to be adjusted. During the scan of the object, the motion of the object may be continuously detected by the light emission device and the light reception device. The scanning device 410 may adjust the one or more scanning parameters based on the motion of the object. Then the scanning device 140 may scan the object based on the adjusted scanning parameter(s) to acquire the scanning data. The image reconstruction device may reconstruct an image of the object based on the acquired scanning data.

Figure 5:
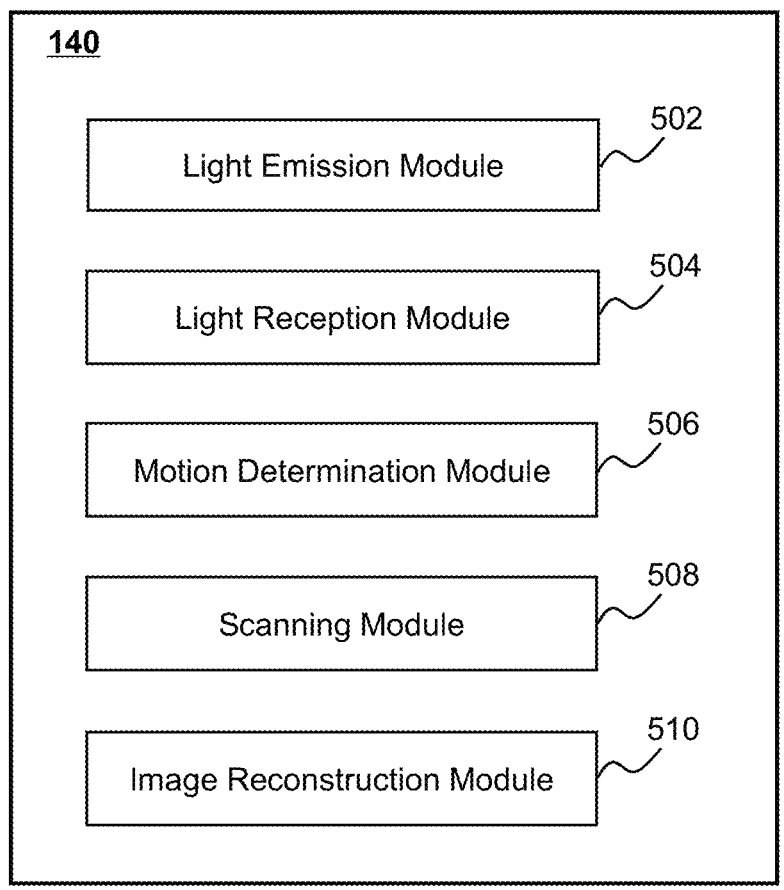
FIG. 5 is a block diagram illustrating an exemplary processing device according to some embodiments of the present disclosure.

FIG. 5 is a block diagram illustrating an exemplary processing device according to some embodiments of the present disclosure. The processing device 140 may be implemented on the computing device 200 (e.g., the processor 210 as illustrated in FIG. 2 or the CPU 340 as illustrated in FIG. 3). The processing device 140 may include a light emission module 502, a light reception module 504, a motion determination module 506, a scanning module 508, and an image reconstruction module 510.

The light emission module 502 may be configured to cause a light emission device (e.g., the light emission device 430) to project a structured light onto an object. In some embodiments, the structured light may be a 3D structured light. The structured light may be a pattern including a dot pattern, a stripe pattern, a checker board pattern, or the like, or any combination thereof. In some embodiments, the light emission module 502 may cause the light emission device to project the structured light onto the object continuously or intermittently. In some embodiments, the light emission device may project the structured light onto a portion of the object (e.g., the chest, the abdomen, the head, or the like, or any combination thereof).

The light reception module 504 may be configured to cause a light reception device (e.g., the light reception device 440) to detect light resulting from the structured light as projected onto the object and generate a plurality of measured images of the structured light based on the detected light. In some embodiments, a measured image may correspond to a moment of the motion of the object (e.g., the cardiac motion, the respiratory motion, the motion of the eye(s), the posture motion). In some embodiments, the light reception module 504 may designate a measured image with the smallest distortion among the plurality of measured images as a reference image.

The motion determination module 506 may be configured to determine the motion (also referred to as motion signal) of the object (e.g., the cardiac motion, the respiratory motion, the motion of the eye(s), the posture motion) based on the plurality of measured images and the reference image. In some embodiments, the motion determination module 506 may determine the motion of the object at a moment based on the measured image corresponding to the moment and the reference image. In some embodiments, for a measured image, the motion determination module 506 may determine a depth image corresponding to the measured image based the measured image and the reference image. The motion determination module 506 may determine the motion based on a plurality of depth images corresponding to the plurality of measured images. In some embodiments, during the scan of the chest or abdomen, the motion of the object may include a cardiac motion and a respiratory motion. The motion determination module 506 may identify the cardiac motion and/or the respiratory motion from the motion of the object.

The scanning module 508 may be configured to cause a scanning device to acquire scanning data of the object by scanning the object. In some embodiments, the scanning module 508 may cause the scanning device to scan the object in a trigger scan mode. For example, the scanning module 508 may cause the scanning device to scan the object based on a stable motion phase of the motion of the object. Alternatively, the scanning module 508 may cause the scanning device to scan the object in a continuous scan mode. After the scanning data is acquired, the scanning module 508 may extract a portion of the scanning data corresponding to the stable motion phase of the motion of the object. In some embodiments, the scanning module 508 may adjust one or more scanning parameters based on the motion of the object. The scanning module 508 may then acquire the scanning data of the object by scanning the object based on the one or more adjusted scanning parameters.

The image reconstruction module 510 may be configured to reconstruct an image of the object based on at least a portion of the scanning data. In some embodiments, the image reconstruction module 510 may reconstruct the image according to a reconstruction technique. Exemplary reconstruction techniques may include but are not limited to an algebraic reconstruction technique (ART), a simultaneous algebra reconstruction technique (SART), a filtered back projection (FBP) technique, a Feldkamp-Davis-Kress (FDK) reconstruction technique, an iterative reconstruction technique, a convolution back projection (CBP) technique, a Fourier back projection technique, or the like, or any combination thereof.

The modules in the processing device 140 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing device 140 may further include a storage module (not shown in FIG. 5). The storage module may be configured to store data generated by the processing device 140.

Figure 6:
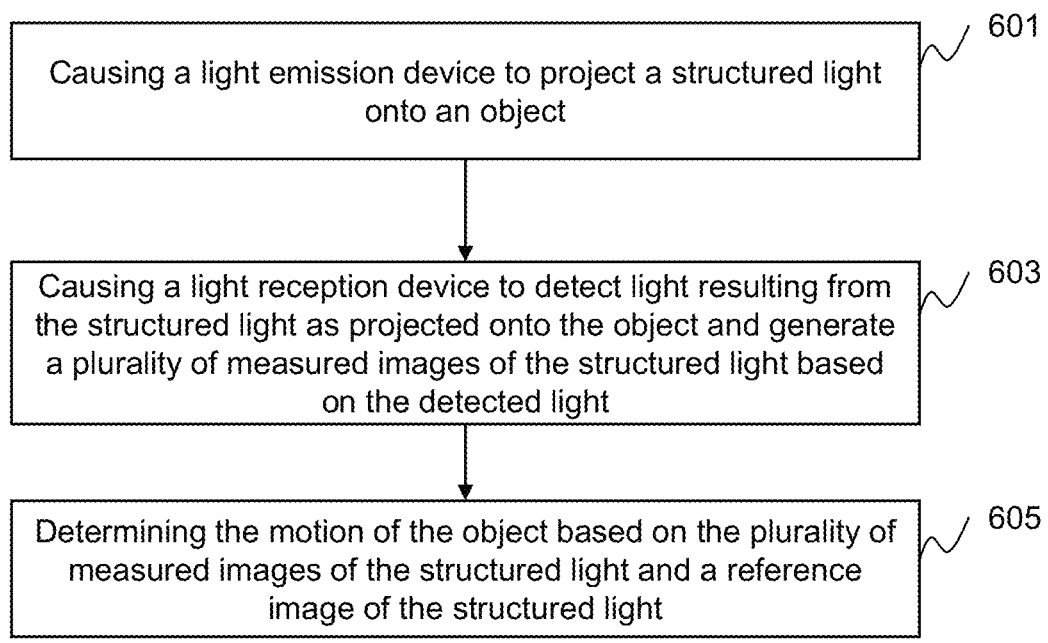
FIG. 6 is a flowchart illustrating an exemplary process for determining the motion of an object according to some embodiments of the present disclosure.

FIG. 6 is a flowchart illustrating an exemplary process for determining the motion of an object according to some embodiments of the present disclosure. For illustration purposes only, the processing device 140 may be described as a subject to perform the process 600. However, one of ordinary skill in the art would understand that the process 600 may also be performed by other entities. In some embodiments, one or more operations of process 600 may be implemented in the imaging system 100 illustrated in FIG. 1. For example, the process 600 may be stored in the storage device 150 and/or the storage 220 in the form of instructions (e.g., an application), and invoked and/or executed by the processing device 140 (e.g., the processor 210 of the computing device 200 as illustrated in FIG. 2, the CPU 340 of the mobile device 300 as illustrated in FIG. 3, one or more modules of the processing device 140 as illustrated in FIG. 5, or the like). As another example, a portion of the process 600 may be implemented on the scanning device 110. The operations of the illustrated process presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting.

In 601, the processing device 140 (e.g., the light emission module 502) may cause a light emission device (e.g., the light emission device 430) to project a structured light onto an object. In some embodiments, the object may include an organ (e.g., a lung, the liver, the stomach), a body part (e.g., the chest, the abdomen, the head), an injured part, a tumor, or the like, or any combination thereof. For example, the light emission device may project the structured light onto a portion of the object (e.g., the chest, the abdomen, the head, or the like, or a combination thereof) In some embodiments, the structured light may be a 3D structured light. The structured light may be a pattern including a dot pattern, a stripe pattern, a checker board pattern, or the like, or any combination thereof. In some embodiments, the structured light provided by the light emission device may be light within a spectral range. For example, the structured light may be an infrared light or an ultraviolet light. The light emission device may be disposed at a first position, e.g., the scanning device (e.g., the gantry) or the scanning table. The processing device 140 may cause the light emission device to project the structured light onto the object continuously or intermittently. More descriptions regarding the light emission device may be found elsewhere in the present disclosure (e.g., FIGS. 4A-4C and the relevant descriptions thereof).

In 603, the processing device 140 (e.g., the light reception module 504) may cause a light reception device (e.g., the light reception device 440) to detect light resulting from the structured light as projected onto the object. In some embodiments, due to the motion of the object (e.g., the cardiac motion, the respiratory motion, the motion of the eyes, the posture change), the distortion of the pattern of the light detected at different moments (or different time points) may be different. Thus, the processing device may cause the light reception device to generate, based on the detected light, a plurality of measured images of the structured light. In some embodiments, a measured image may correspond to a moment of the motion of the object. In some embodiments, the processing device 140 may designate a measured image with the smallest distortion among the plurality of measured images as a reference image. The reference image and the plurality of measured images may be configured to determine the motion of the object.

In some embodiments, the light reception device may include an image sensor. The image sensor may be configured to detect the light resulting from the structured light as projected onto the object and generate the plurality of measured images of the structured light based on the detected light. The image sensor may include a charge-coupled device (CCD), a complementary metal-oxide semiconductor (CMOS), or the like, or any combination thereof. In some embodiments, the light reception device may be disposed at a second position different from the first position. For example, the light emission device and the light reception device may be disposed at two different positions on the gantry of the scanning device, two different positions on the scanning table, two different positions on the coil component, two different positions on a frame, etc. As another example, one of the light emission device and the light reception device may be disposed at the scanning table, while the other may be disposed at the gantry of the scanning device. As a further example, one of the light emission device and the light reception device may be disposed at the coil component, while the other may be disposed at the gantry of the scanning device. In some embodiments, the light emission device and the light reception device may satisfy a geometrical relationship. The geometrical relationship may be characterized by at least one of a distance between the light emission device and the light reception device (i.e., a distance between the first position and the second position), an orientation of the light emission device, an orientation of the light reception device, or the like, or a combination thereof.

In some embodiments, there may be a plurality of light reception devices disposed at different positions. A light reception device may be configured to detect at least a portion of the detected light. In some embodiments, the light reception devices at different positions may have different sensitivities to the motion of the object. For example, a first light reception device may be disposed over the object, and a second light reception device may be disposed on one side of the object. The first light reception device may have a higher sensitivity to the motion of the object than the second light reception device. When determining the motion of the object, the processing device 140 may assign different weights to the information (e.g., image data) acquired by the two light reception devices. For example, information acquired by the first light reception device may be assigned a greater weight than information acquired by the second light reception device. More descriptions regarding the light reception device may be found elsewhere in the present disclosure (e.g., FIGS. 4A-4C and the relevant descriptions thereof).

In 605, the processing device 140 (e.g., the motion determination module 506) may determine the motion (also referred to as a motion signal) of the object based on the plurality of measured images of the structured light and the reference image of the structured light. As described in operation 603, the reference image may have the smallest distortion among the plurality of measured images. A measured image may correspond to a moment of the physiological motion. The processing device 140 may determine the physiological motion at a moment based on the measured image corresponding to the moment and the reference image.

In some embodiments, the plurality of measured images and the reference image may correspond to a same portion of the object. Specifically, each of the plurality of measured images may include a plurality of pixels corresponding to a plurality of positions on the object. The reference image may also include a plurality of pixels corresponding to the plurality of positions on the object. For a measured image, the processing device 140 may determine a plurality of measured distances based on the geometrical relationship and the measured image. A measured distance may be a distance between one of the plurality of positions on the object as represented in the measured image and the light emission device. The processing device 140 may determine a plurality of reference distances based on the geometrical relationship and the reference image. A reference distance may be a distance between one of the plurality of positions on the object as represented in the reference image and the light emission device. The processing device 140 may determine a depth image corresponding to the measured image based on a plurality of differences. Each of the plurality of differences may be between one of the plurality of measured distances of a position on the object and a reference distance of the same position on the object. The processing device 140 may then determine the motion of the object based on a plurality of depth images corresponding to the plurality of measured images. Details regarding the determination of the motion may be found elsewhere in the present disclosure. See, e.g., FIG. 7 and the descriptions thereof.

In some embodiments, the motion of the object may include a cardiac motion, a respiratory motion, a motion of the eyes, a posture change. During a scan of the chest or the abdomen, the motion of the object may include the cardiac motion and the respiratory motion. The processing device 140 may identify the cardiac motion and the respiratory motion from the motion of the object, respectively. In some embodiments, the processing device 140 may identify one or more pixels corresponding to the cardiac motion (e.g., pixels corresponding to the heart) from one or more of the plurality of depth images using an image recognition algorithm. The processing device 140 may determine the cardiac motion based on the identified pixels from one or more of the plurality of depth images. Similarly, the processing device 140 may identify one or more pixels corresponding to the respiratory motion (e.g., pixels corresponding to a lung, the diaphragm) from the one or more of the plurality of depth images using an image recognition algorithm. The processing device 140 may determine the respiratory motion based on the identified pixels from the one or more of the plurality of depth images. Exemplary image recognition algorithms may include a neural network-based image recognition algorithm (such as a convolutional neural network (CNN), a recurrent neural network (RNN), a Faster-RCNN, etc.), a wavelet moment-based image recognition algorithm, or the like, or any combination thereof.

In the prior art, the motion of the eyes and/or the posture change of the head of the object cannot be detected during the imaging, which may result in motion artifacts in a reconstructed image. The respiratory motion of the object may be detected by a pressure sensor, and/or the cardiac motion of the object may be detected by electrocardiogram (ECG) electrodes. In some embodiments of the present disclosure, without the need to place one or more monitor devices (e.g., a pressure sensor, ECG electrodes) on the object, the motion (e.g., the respiratory motion, the cardiac motion, the motion of the eyes, the posture change) of the object may be detected using the light emission device and the light reception device. The light emission device and the light reception device may be disposed at two fixed positions. Thus, to detect motions of different objects, there is no need to rearrange the light emission device and the light reception device, thereby saving the overall imaging time. Besides, during the scan of the chest or the abdomen, the respiratory motion and the cardiac motion may be simultaneously detected and may both be considered, which may effectively correct motion artifacts in a reconstructed image and improve the quality of the reconstructed image.

It should be noted that the above description of the process 600 is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure. In some embodiments, there may be two light reception devices (e.g., a first light reception device and a second light reception device). The first light reception device may be configured to detect light resulting from the structured light as projected onto a first portion of the object. The second light reception device may be configured to detect light resulting from the structured light as projected onto a second portion of the object. Then the processing device 140 may determine the physiological motion corresponding to the first portion of the object and determine the physiological motion corresponding to the second portion of the object, respectively. For instance, the first portion of the object may correspond to the cardiac motion, and the second portion of the object may correspond to the respiratory motion.

Figure 7:
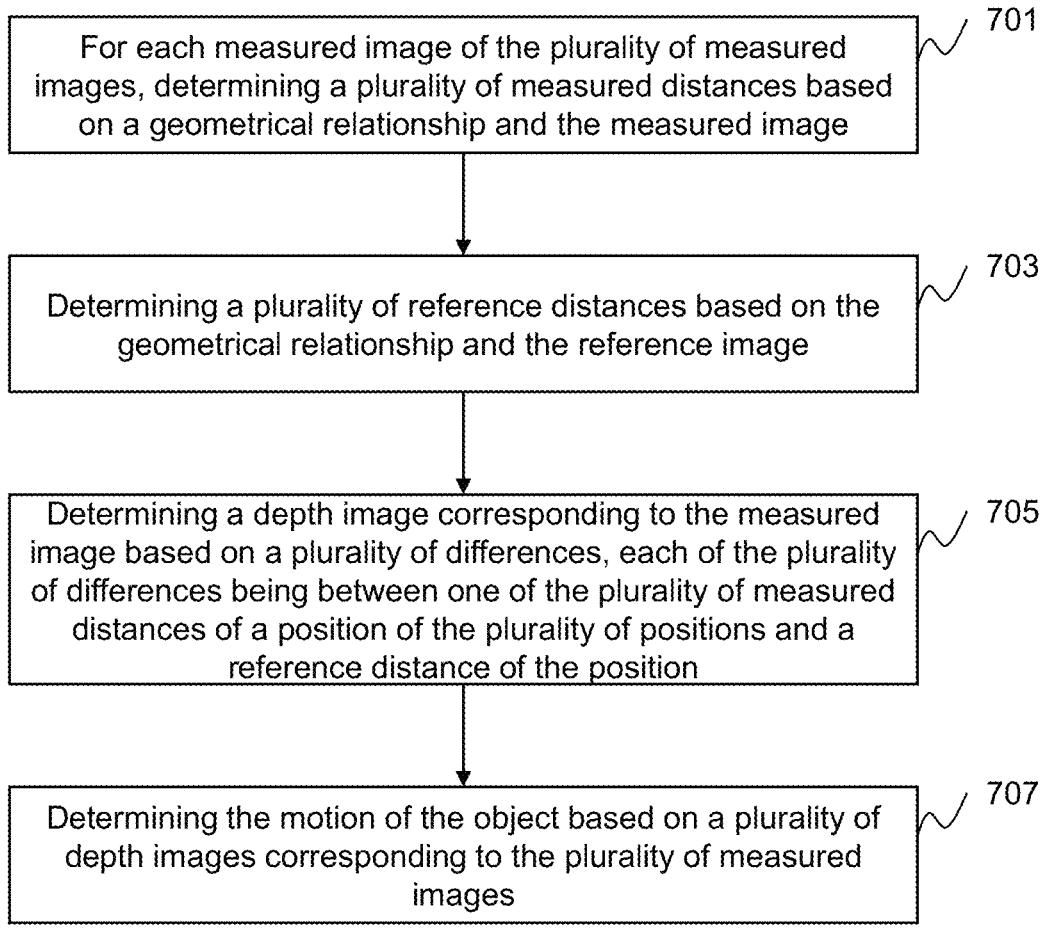
FIG. 7 is a flowchart illustrating an exemplary process for determining the motion of an object according to some embodiments of the present disclosure.

FIG. 7 is a flowchart illustrating an exemplary process for determining the motion of an object according to some embodiments of the present disclosure. For illustration purposes only, the processing device 140 may be described as a subject to perform the process 700. However, one of ordinary skill in the art would understand that the process 700 may also be performed by other entities. In some embodiments, one or more operations of process 700 may be implemented in the imaging system 100 illustrated in FIG. 1. For example, the process 700 may be stored in the storage device 150 and/or the storage 220 in the form of instructions (e.g., an application), and invoked and/or executed by the processing device 140 (e.g., the processor 210 of the computing device 200 as illustrated in FIG. 2, the CPU 340 of the mobile device 300 as illustrated in FIG. 3, one or more modules of the processing device 140 as illustrated in FIG. 5, or the like). As another example, a portion of the process 700 may be implemented on the scanning device 110. The operations of the illustrated process presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting.

In some embodiments, the light reception device may generate a plurality of measured images of the structured light and a reference image of the structured light. In some embodiments, the reference image may have the smallest distortion among the plurality of measured images. In some embodiments, a measured image may correspond to a moment of the motion of the object (e.g., the cardiac motion, the respiratory motion, the motion of the eyes, the posture change). Thus, the physiological motion at a moment may be determined based on the measured image corresponding to the moment and the reference image. The measured image may include a plurality of pixels corresponding to a plurality of positions on the object. The reference image may also include a plurality of pixels corresponding to the plurality of positions on the object.

In 701, the processing device 140 (e.g., the motion determination module 506) may, for each measured image of the plurality of measured images, determine a plurality of measured distances based on a geometrical relationship and the measured image. A measured distance may be a distance between one of the plurality of positions on the object and the light emission device. The geometrical relationship may be characterized by at least one of a distance between the light emission device and the light reception device, an orientation of the light emission device, an orientation of the light reception device, or the like, or any combination thereof.

In 703, the processing device 140 (e.g., the motion determination module 506) may determine a plurality of reference distances based on the geometrical relationship and the reference image. A reference distance may be a distance between one of the plurality of positions on the object and the light emission device.

In some embodiments, the processing device 140 may determine a measured distance between a position and the light emission device using a triangle localization algorithm. Merely by way of example, the position may correspond to a measured pixel of the measured image. In some embodiments, the measured pixel of the measured image may correspond to a point of the pattern of the structured light. The processing device 140 may determine distortion (e.g., displacement) of the measured pixel of the measured image with respect to the corresponding point of the pattern of the structured light. The geometrical relationship (such as the distance between the light emission device and the light reception device, the orientation of the light emission device, the orientation of the light reception device) may be known. The processing device 140 may determine the measured distance between the position and the light emission device based on the distortion (or displacement) of the measured pixel of the measured image and the geometrical relationship. Similarly, the processing device 140 may also determine a reference distance between the position and the light emission device using the triangle localization algorithm. Merely by way of example, the position may correspond to a reference pixel of the reference image. In some embodiments, the reference pixel of the reference image may correspond to the point of the pattern of the structured light. The processing device 140 may determine distortion (e.g., displacement) of the reference pixel of the reference image with respect to the corresponding point of the pattern of the structured light. The geometrical relationship (such as the distance between the light emission device and the light reception device, the orientation of the light emission device, the orientation of the light reception device) may be known. The processing device 140 may determine the reference distance between the position and the light emission device based on the distortion (or displacement) of the reference pixel of the reference image and the geometrical relationship. It should be noted that the measured distance (or the reference distance) between the position and the light emission device is merely for illustration purposes. In some embodiments, the processing device 140 may determine a distance between the position and the light reception device as the measured distance (or the reference distance), or determine a distance from the position to a line connecting the light emission device and the light reception device as the measured distance (or the reference distance).

In 705, the processing device 140 (e.g., the motion determination module 506) may determine a depth image corresponding to the measured image based on a plurality of differences. The depth image may include a plurality of pixel values representing a plurality of differences corresponding to the plurality of positions. A difference may be a difference between one of the plurality of measured distances of a position of the plurality of positions on the object and a reference distance of the same position on the object. Merely by way of example, for a position of the plurality of positions, the processing device 140 may determine a difference between the measured distance of the position and the reference distance of the position.

In 707, the processing device 140 (e.g., the motion determination module 506) may determine the motion (also referred to as motion signal) of the object based on a plurality of depth images corresponding to the plurality of measured images. The motion of the object may include a cardiac motion, a respiratory motion, a motion of the eyes, a posture change, or the like. In some embodiments, each depth image may correspond to a measured image. The measured image may correspond to a moment of the motion of the object. Thus, each depth image may correspond to a moment of the motion of the object. The processing device 140 may analyze the changes of the depth images at different moments (or time points) to determine the motion of the object.

It should be noted that the above description of the process 700 is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure. In some embodiments, for a measured image, the processing device 140 may determine a depth image corresponding to the measured image based on the measured image and the reference image. Merely by way of example, for a position of the object, the position may correspond to a measured pixel of the measured image and correspond to a reference pixel of the reference image. The processing device 140 may determine distortion (e.g., displacement) of the measured pixel of the measured image with respect to the reference pixel of the reference image. The geometrical relationship (such as the distance between the light emission device and the light reception device, the orientation of the light emission device, the orientation of the light reception device) may be known. The processing device 140 may determine a difference corresponding to the position based on the distortion of the measured pixel of the measured image and the geometrical relationship. The processing device 140 may then determine the depth image corresponding to the measured image based on a plurality of differences.

In some embodiments, the motion of the object may include a cardiac motion, a respiratory motion, a motion of the eyes, the posture change, or the like. In some embodiments, the motion may include a stable motion phase and an unstable motion phase. Merely by way of example, for the cardiac motion, the stable motion phase may correspond to mid and late diastole, and the unstable motion phase may correspond to systole. For the respiratory motion, the stable motion phase may correspond to an expiratory phase, and the unstable motion phase may correspond to an inspiratory phase. For the motion of the eyes, the stable motion phase may correspond to an eye opening phase, and the unstable motion phase may correspond to an eye blinking phase. For a posture change, if the posture change of the object is within a predetermined range, the posture change may be regarded as in the stable phase. If the posture change of the object is beyond the predetermined range, the posture change may be regarded as in the unstable phase. The predetermined range may be a default value or an empirical value related to the imaging system 100, or a value provided by a user. In some embodiments, an image reconstruction device (e.g., the image reconstruction device as illustrated in FIG. 4) may reconstruct an image of the object based on scanning data obtained by a scanning device (e.g., the scanning device 410) and the motion of the object. The motion of the object may be used to correct and/or reduce motion artifacts in the reconstructed image.

Figure 8A:
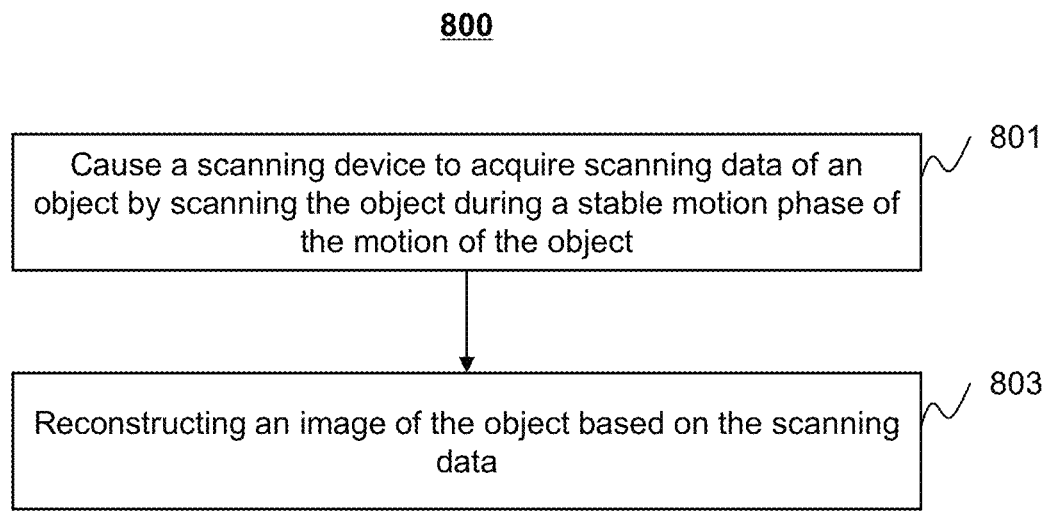
FIGS. 8A and 8B are flowcharts illustrating two exemplary processes for reconstructing an image of an object according to some embodiments of the present disclosure.
Figure 8B:
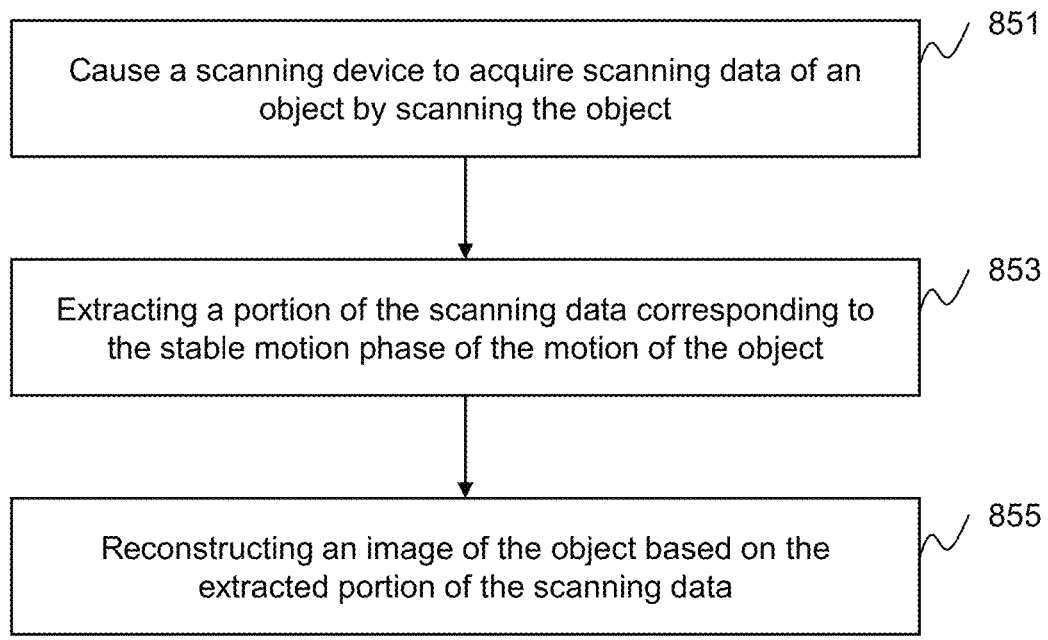

FIGS. 8A and 8B are flowcharts illustrating two exemplary processes for reconstructing an image of an object according to some embodiments of the present disclosure. For illustration purposes only, the processing device 140 may be described as a subject to perform the process 800 (or process 850). However, one of ordinary skill in the art would understand that the process 800 (or process 850) may also be performed by other entities. In some embodiments, one or more operations of process 800 (or process 850) may be implemented in the imaging system 100 illustrated in FIG. 1. For example, the process 800 (or process 850) may be stored in the storage device 150 and/or the storage 220 in the form of instructions (e.g., an application), and invoked and/or executed by the processing device 140 (e.g., the processor 210 of the computing device 200 as illustrated in FIG. 2, the CPU 340 of the mobile device 300 as illustrated in FIG. 3, one or more modules of the processing device 140 as illustrated in FIG. 5, or the like). As another example, a portion of the process 800 (or process 850) may be implemented on the scanning device 110. The operations of the illustrated process presented below are intended to be illustrative. In some embodiments, the process 800 (or process 850) may be accomplished with one or more additional operations not described, and/or without one or more of the operations discussed. Additionally, the order in which the operations of the process 800 (or process 850) as illustrated in FIG. 8A (or FIG. 8B) and described below is not intended to be limiting.

FIG. 8A is a flowchart illustrating an exemplary process for reconstructing an image of the object according to some embodiments of the present disclosure. In FIG. 8A, scanning data of the object may be acquired by a trigger scan mode. The trigger scan mode may refer to a technique of scanning an object intermittently in response to a trigger signal (e.g., a pulse signal, electrical signal).

In 801, the processing device 140 (e.g., the scanning module 508) may cause a scanning device (e.g., the scanning device 410) to acquire scanning data of the object by scanning the object during the stable motion phase of the motion. In some embodiments, when the object is moved into the detection tunnel of the scanning device, the processing device 140 may determine the motion of the object in real-time using the light emission device and the light reception device. The motion may include a stable motion phase (e.g., the mid and late diastole, the expiratory phase, the eye opening phase) and an unstable motion phase (e.g., the systole, the inspiratory phase, the eye blinking phase). In some embodiments, the processing device 140 may trigger the scanning device to acquire the scanning data of the object based on the motion. For example, when the motion enters into the stable motion phase (e.g., after a falling edge of a period diagram of the motion), the processing device 140 may trigger the scanning device to acquire scanning data of the object. As another example, when the motion enters into the unstable motion phase (e.g., before a rising edge of the period diagram of the physiological motion), the processing device 140 may cause the scanning device to stop acquiring scanning data of the object. Thus, the scanning data acquired by the scanning device may be barely affected by the motion of the object. In some embodiments, when the posture change of the object is beyond the predetermined range, an operator (e.g., a doctor) may remind the object to return to the prior posture for subsequent scan.

In 803, the processing device 140 (e.g., the image reconstruction module 510) may reconstruct an image of the object based on the scanning data. In some embodiments, the image may be a two-dimensional (2D) image, a three-dimensional (3D) image, or the like. In some embodiments, the processing device 140 may reconstruct the image according to a reconstruction technique. Exemplary reconstruction techniques may include but are not limited to an algebraic reconstruction technique (ART), a simultaneous algebra reconstruction technique (SART), a filtered back projection (FBP) technique, a Feldkamp-Davis-Kress (FDK) reconstruction technique, an iterative reconstruction technique, a convolution back projection (CBP) technique, a Fourier back projection technique, or the like, or any combination thereof.

FIG. 8B is a flowchart illustrating another exemplary process for reconstructing an image of the object according to some embodiments of the present disclosure. In FIG. 8B, scanning data of the object may be acquired by a continuous scan mode. The continuous scan mode may refer to a technique of scanning an object continuously after starting the scan.

In 851, the processing device 140 (e.g., the scanning module 508) may cause the scanning device (e.g., the scanning device 410) to acquire scanning data of an object by scanning the object. In some embodiments, when the object is moved into the detection tunnel of the scanning device, the processing device 140 may simultaneously or synchronously determine the motion of the object using the light emission device and the light reception device and cause the scanning device to acquire scanning data of the object. In some embodiments, scanning data may correspond to various phases of the motion of the object. In some embodiments, the motion may include a stable motion phase (e.g., the mid and late diastole, the expiratory phase, the eye opening phase) and an unstable motion phase (e.g., the systole, the inspiratory phase, the eye blinking phase). A portion of the scanning data may correspond to the stable motion phase of the motion. A portion of the scanning data may correspond to the unstable motion phase of the motion.

In 853, the processing device 140 (e.g., the scanning module 508) may extract the portion of the scanning data corresponding to the stable motion phase of the motion. In some embodiments, the processing device 140 may determine the stable motion phase of the motion and determine a portion of the scanning data corresponding to the stable motion phase. The processing device 140 may then extract the portion of the scanning data. The extracted portion of the scanning data may be barely affected by the motion of the object.

In 855, the processing device 140 (e.g., the image reconstruction module 510) may reconstruct an image of the object based on the extracted portion of the scanning data. In some embodiments, the image may be a two-dimensional (2D) image, a three-dimensional (3D) image, or the like. In some embodiments, the processing device 140 may reconstruct the image according to a reconstruction technique. Exemplary reconstruction techniques may include but are not limited to an algebraic reconstruction technique (ART), a simultaneous algebra reconstruction technique (SART), a filtered back projection (FBP) technique, a Feldkamp-Davis-Kress (FDK) reconstruction technique, an iterative reconstruction technique, a convolution back projection (CBP) technique, a Fourier back projection technique, or the like, or any combination thereof.

In some embodiments of the present disclosure, the processing device 140 may reconstruct an image of the object using scanning data acquired or obtained when the motion of the object is relatively stable, which may effectively reduce or remove motion artifacts in the reconstructed image.

It should be noted that the above description of the process 800 is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure. In some embodiments, in 853, the processing device 140 may extract a second portion of the scanning data corresponding to the unstable motion phase. In 855, the processing device 140 may then reconstruct a second image of the object based on the extracted second portion of the scanning data. In some embodiments, in 853, the processing device 140 may divide the motion into a plurality of motion phases (e.g., 5 motion phases, 8 motion phases, 10 motion phases, etc.). The processing device 140 may divide the scanning data into a plurality of groups of gated scanning data based on the plurality of motion phases. In 855, the processing device 140 may then reconstruct a plurality of gated image based on the plurality of groups of gated scanning data. A gated image may correspond to one of the plurality of motion phases.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A non-transitory computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system, comprising:
   a scanning device configured to acquire scanning data of an object by scanning the object;
   a coil component;
   a light emission device configured to project a structured light onto the object;
   a light reception device configured to detect light resulting from the structured light as projected onto the object and generate a plurality of measured images of the structured light based on the detected light, wherein the light emission device and the light reception device are positioned above the object, the light emission device and the light reception device are disposed inside the coil component or mounted on the coil component, and a distance between the light emission device and the light reception device is determined based on a size of the coil component; and
   a motion determination device configured to determine a motion of the object based on a plurality of depth images corresponding to the plurality of measured images.

2. The system of claim 1, further comprising:
   an image reconstruction device configured to reconstruct an image of the object based on the scanning data.

3. The system of claim 2, wherein the image reconstruction device is configured to reconstruct the image of the object based on the scanning data and the motion of the object.

4. The system of claim 1, wherein
   the motion of the object includes a stable motion phase; and
   the scanning device is configured to acquire the scanning data of the object by scanning the object during the stable motion phase.

5. The system of claim 1, wherein the scanning device is configured to:
   adjust, based on the motion of the object, one or more scanning parameters; and
   acquire the scanning data by scanning, based on the adjusted one or more scanning parameters, the object.

6. The system of claim 1, wherein the scanning device comprises a gantry and the light emission device and the light reception device are positioned on the gantry of the scanning device.

7. The system of claim 1, further comprising a coif component, wherein:
   at least one of the light emission device and the light reception device are positioned on the coil component.

8. The system of claim 7, wherein one of the light emission device and the light reception device is positioned on the coil component, and the other is positioned on the scanning device.

9. The system of claim 1, wherein
   each of the plurality of measured images includes a plurality of pixels corresponding to a plurality of positions on the object,
   the motion determination device is further configured to:
      for each measured image of the plurality of measured images,
         determine, based on the positions of the light emission device and the light reception device and the measured image, a plurality of measured distances, each of the plurality of measured distances being between one of the plurality of positions and the light emission device;
         determine, based on the positions of the light emission device and the light reception device and a reference image, a plurality of reference distances, each of the reference image including a plurality of pixels corresponding to the plurality of positions on the object and each of the plurality of reference distances being between one of the plurality of positions and the fight emission device; and
         determine a depth image corresponding to the measured image based on a plurality of differences, each of the plurality of differences being between one of the plurality of measured distances of a position of the plurality of positions and a reference distance of the same position before determining the motion of the object based on the plurality of depth images corresponding to the plurality of measured images.

10. The system of claim 1 wherein the system includes:
    a plurality of light emission devices disposed at different positions, each of which is configured to project at least a portion of the structured light onto at least a portion of the object; or
    a plurality of light reception devices disposed at different positions, each of which is configured to detect at least a portion of the detected light.

11. The system of claim 1, wherein the motion of the object includes at least one of a physiological motion of the object and a posture change of the object.

12. A method of using a system to determine a motion of an object during imaging,
    the system comprises a scanning device, a coil component, a light emission device, a light reception device and a motion determination device, wherein the light emission device and the light reception device are positioned above the object, the light emission device and the light reception device are disposed inside the coil component or mounted on the coil component, and a distance between the light emission device and the light reception device is determined based on a size of the coil component, the method comprising:
- using the scanning device to scan the object to acquire scanning data of the object;
- using the light emission device to project a structured light onto the object;
- using the light reception device to detect light resulting from the structured light as projected onto the object and generate a plurality of measured images of the structured light based on the detected light;
- determining a plurality of depth images corresponding to the plurality of measured images; and
- determining a motion of the object based on the plurality of depth images corresponding to the plurality of measured images.

13. The method of claim 12, wherein
each of the plurality of measured images includes a plurality of pixels corresponding to a plurality of positions on the object,
the determining the motion of the object comprises:
- for each measured image of the plurality of measured images,
  - determining, based on the positions of the light emission device and the light reception device and the measured image, a plurality of measured distances, each of the plurality of measured distances being between one of the plurality of positions and the light emission device;
  - determining, based on the positions of the light emission device and the light reception device and a reference image, a plurality of reference distances, each of the reference image including a plurality of pixels corresponding to the plurality of positions on the object and each of the plurality of reference distances being between one of the plurality of positions and the light emission device; and
  - determining a depth image corresponding to the measured image based on a plurality of differences, each of the plurality of differences being between one of the plurality of measured distances of a position of the plurality of positions and a reference distance of the same position before determining the motion of the object based on the plurality of depth images corresponding to the plurality of measured images.

14. The method of claim 12, wherein the motion includes a stable motion phase and an unstable motion phase, and the method further comprising
- scanning the object during the stable motion phase to acquire scanning data of the object during the stable motion phase; and
- reconstructing an image of the object based on the scanning data of the object during the stable motion phase.

15. The method of claim 12, wherein the motion includes a stable motion phase and an unstable motion phase, and the method further comprising:
- scanning the object to acquire scanning data of the object;
- extracting a portion of the scanning data corresponding to the stable motion phase; and
- reconstructing an image of the object based on the extracted portion of the scanning data.

16. The method of claim 12, wherein the motion of the object includes at least one of a physiological motion of the object and a posture change of the object.

17. A system, comprising:
- at least one storage device including a set of instructions; and
- at least one processor in communication with the at least one storage device to execute the set of instructions to direct the action of an imaging system, the imaging system comprises a scanning device, a coil component, a light emission device, a light reception device and a motion determination device, wherein the light emission device and the light reception device are positioned above the object, the light emission device and the fight reception device are disposed inside the coil component or mounted on the coil component, and a distance between the light emission device and the light reception device is determined based on a size of the coil component,
wherein the imaging system is directed to:
using the scanning device to scan the object to acquire scanning data of the object;
using the light emission device to project a structured light onto the object;
using the light reception device to detect light resulting from the structured light as projected onto the object and generate a plurality of measured images of the structured light based on the detected light;
determining a plurality of depth images corresponding to the plurality of measured images; and
determining a motion of the object based on the plurality of depth images corresponding to the plurality of measured images.

* * * * *